United States Patent Office 2,789,959
Patented Apr. 23, 1957

2,789,959

PERFLUOROCHLOROOLEFIN HOMOPOLYMER PLASTICIZED WITH PERCHLOROOLEFIN COPOLYMERS

Richard A. Smith, Cornwall on the Hudson, N. Y., assignor to The M. W. Kellogg Company, Jersey City, N. J., a corporation of Delaware No Drawing. Application November 27, 1953, Serial No. 394,895

16 Claims. (Cl. 260—45.5)

This invention relates to halogen-containing plastics. In one of its aspects, this invention relates to a plasticizer for perfluorochloroolefin plastics while in one of its more particular aspects, this invention relates to the plasticization of homopolymers of trifluorochloroethylene. In another of its aspects, this invention relates to a process for plasticizing perfluorochloroolefin polymers, such as homopolymers of trifluorochloroethylene.

Because of their unusual chemical and physical characteristics the fluorine-containing thermoplastic polymers are widely used in numerous industrial applications where their properties are best exploited. Among the most outstanding of the properties of the fluorine containing thermoplastic polymers, such as polymers of trifluorochloroethylene, is chemical inertness. Thus, these polymers may be exposed to a wide variety of oxidizing, reducing and solvent-type reagents such as, fuming nitric acid, hydrazine, and aniline with no apparent effect on the polymer. In addition to their high degree of chemical stability, these polymers possess high thermal stability, excellent electrical properties and are readily molded into various useful items.

In many of the applications in which industrial users employ these plastic polymers, it is desirable that the properties of the polymer be somewhat modified. Modification of the polymer's properties is usually effected by plasticization. The addition of a plasticizer makes the polymer softer and more elastic. In the past, plasticization of the perfluorochloroolefin polymers was effected by adding a lower molecular weight perfluorochloroolefin polymer, i. e., a polymer in the oil, grease or wax range. For example, in plasticizing solid, plastic homopolymers of trifluorochloroethylene, a liquid polymer of trifluorochloroethylene was used. While the use of this type material as plasticizer is quite good in modifying the properties of the thermoplastic polymer some inherent disadvantages are attendant on its use. Thus, these liquid polymers are volatile, solvent soluble, have limited compatability with the thermoplastic polymer, a tendency to "bleed," and are deleteriously effected at low temperatures. In addition, the chemical stability of these liquid plasticizers is not as great as might be desired.

It is an object of this invention to provide a non-volatile plasticizer for plasticizing perfluorochloroolefin homopolymers.

It is another object of this invention to provide a plasticizer for perfluorochloroolefin homopolymers which is not substantially subject to solvent extraction.

It is another object of this invention to provide a plasticizer for perfluorochloroolefin homopolymers which has an unlimited compatability with the thermoplastic homopolymer which is to be plasticized.

It is another object of this invention to provide a chemically stable plasticizer.

It is another and more particular object of this invention to provide a plasticizer for homopolymers of trifluorochloroethylene.

It is one of the additional objects of this invention to provide a process for plasticizing homopolymers of trifluorochloroethylene.

Various other objects and advantages of the present invention will become apparent to those skilled in the art on reading the accompanying description and disclosure.

In general the above objects are accomplished by admixing with the thermoplastic homopolymer of the perfluorochloroolefin that is to be plasticized, a normally solid copolymer of a perfluorochloroolefin, such as trifluorochloroethylene, copolymerized with another halogenated olefin.

The homopolymers of the perfluorochloroolefins which are susceptible to plasticization by the process of this invention are prepared by the polymerization of perfluorochloroolefins, such as trifluorochloroethylene, 1,1-dichloro 2,2-difluoroethylene, 1,2-dichloro-1,2-difluoroethylene and trichlorofluoroethylene, to produce a thermoplastic material having an N. S. T. above about 220° C.

The copolymers which serve as plasticizers in this invention comprise perfluorochloroolefins, such as trifluorochloroethylene, 1,1-dichloro 2,2-difluoroethylene, 1,2-dichloro-1,2-difluoroethylene and trichlorofluoroethylene copolymerized with halogenated olefins, such as vinyl chloride, vinylidene chloride, vinyl fluoride, vinylidene fluoride, 1,1-fluorochloroethylene and trifluroroethylene. These copolymeric plasticizers are normally solid and have softening points above about 150° C. A particularly suitable plasticizer is a copolymer of trifluorochloroethylene and vinylidene fluoride wherein trifluorochloroethylene is present in an amount between about 5 and about 95 mol percent. Preferably, the trifluorochloroethylene-vinylidene fluoride copolymers contain trifluorochloroethylene in an amount between about 20 and about 80 mol percent and still more preferably a copolymer which contains between above about 69 and about 80 mol percent of trifluorochloroethylene.

A particularly surprising feature of this invention is the extent of plasticization achived by the inclusion of only a small amount of plasticizer. For example, when a homopolymer of trifluorochloroethylene was plasticized with about 5 percent of the solid plasticizer (see Example I) a film was obtained which had the characteristics of a film plasticized with about 25 percent of the prior art plasticizers, i. e., a polytrifluorochloroethylene oil. The plasticizers of this invention are compatible with the material that is to be plasticized in all proportions. However, it is preferred to use less than 50 weight percent of the plasticizer and preferably, because of the extent to which these plasticizers affect that material that is to be plasticized between about 1 and about 25 weight percent.

Since the process of this invention relates to new and novel plasticizers, and their use, unnecessarily detailed description of the method of preparation of the plasticizer is not warranted. Therefore, only methods of preparation of the preferred plasticizer are given although by employing substantially identical polymerization systems but with different monomer feed ratios and polymerization times any copolymer in the range contemplated by this invention may be prepared.

The preferred plasticizer may be prepared by the procedure given below using the following water-suspension type recipe.

| | Parts by weight |
|---|---|
| Water, distilled | 200 |
| $CF_2=CFCl$ _____ 86/14 molar | 92.2 |
| $CF_2=CH_2$ _____ 86/14 molar | 7.8 |
| $(NH_4)_2S_2O_8$ | 2.0 |
| $Na_2S_2O_5$ | 0.8 |
| $FeSO_4 \cdot 7H_2O$ | 0.2 |

Catalyst and activator solution was prepared by dissolving 2 parts of $(NH_4)_2S_2O_8$ in 20 parts of water. Next, 0.8 parts of $Na_2S_2O_5$ were dissolved in another 20 parts of water. In still another 20 parts of water, 0.2 part of $FeSO_4.7H_2O$ was dissolved. 140 parts of water were next charged to a silver-lined steel bomb. The aforementioned $(NH_4)_2S_2O_8$, $Na_2S_2O_5$, and the $FeSO_4.7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$, combined in the resulting copolymeric product was 75 percent.

Admixture of the plasticizer with the polymer may be effected in a variety of ways although usually the conventional mechanical techniques are preferred. The method to be employed in effecting the admixture is based on the form of the polymer and plasticizer. Thus, if both the polymer and the plasticizer are finely-divided i. e. in the form of a powder, conventional tumbling type mixers such as a barrel mixer, conical mixer and mushroom mixer may be employed. If the polymer and plasticizer are not in a sufficiently finely divided form, then they may be ground in a suitable grinding type mixer such as a Mikropulverizer. Admixture may also be effected by a wet blending technique employing a suitable solvent. Complete solubility of the plasticiizer, while preferred, is not essential. Admixture, when using wet blending techniques, is effected by placing the ingredients in the desired proportion in an apparatus suitable for wet blending, such as a ball mill.

Suitable solvents are the oxygenated organic solvents in some of which the plasticizer is completely soluble, while in others it is partially soluble. Thus, the plasticizer is soluble in tetrahydrofuran, tetrahydro-2-methyl furan, tetrahydropyran, 3-chlorotetrahydrofuran and dioxane. Among the solvents in which the plasticizer is partially soluble are ethyl acetate, isobutyl propionate, amyl acetate, methyl ethyl ketone, isophorone, diisobutyl ketone, cyclohexanone, mesityl oxide, 1-chloro 1-nitroethane and 2-chloro 2-nitropropane. A particularly suitable solvent is tetrahydrofuran; a particularly suitable mixture is tetrahydrofuran and dioxane. Preferably equal amounts by volume of each solvent constitute the mixture although the solvent in which the plasticizer is completely soluble may constitute from about 25 percent to about 95 percent of the mixture.

Molding of the plasticized polymer powder may be accomplished by using suitable molding equipment at a temperature between about 415° F. and about 625° F. and a pressure between about 500 and about 25,000 pounds per square inch. Detailed description of the preferred molding processes may be found in U. S. Patents 2,617,149, 2,617,150, 2,617,151, and 2,617,152, issued November 11 1952 to Louis C. Rubin. When the plasticized polymer powder of this invention is molded by any of the above described processes a homogeneous polymer mass is produced which contains, intimately dispersed within this mass, the added plasticizer. When a solvent has been used in the blendinng operation, the solvent is preferably evaporated, by heating or air-drying before the molding operation is begun.

The copolymeric plasticizer of this invention may be treated in such a way as to induce cross-linking of the copolymer chain. For this purpose a copolymer containing between about 20 and about 69 mol percent of perfluorochloroolefin, such as trifluorochloroethylene, is preferred. This cross-linking modifies the properties of the plasticizer and enhances its suitability for use in certain applications. These cross-linked polymers are considerably less soluble, have increased strength, toughness, heat resistance, and greater chemical resistance. Generally, cross-linking of the copolymeric plasticizers is effected by incorporating within the copolymer a cross-linking agent which may be a peroxy-type compound, a basic metal oxide or an inorganic polysulfide. The peroxy-type compounds include both organic and inorganic compounds which contain oxygen atoms directly linked to oxygen atoms, and should be stable below about 50° C. or else they will cause cross-linking while they are being blended into the copolymer. Among the organic compounds are the aryl and acyl peroxides and hydoperoxides such as, di-tertiary butyl peroxide, di-lauryl peroxide, di-benzoyl peroxide, and ditertiary butyl hydroperoxide. The organic peroxy-type compounds also include peresters having either organic or inorganic peroxy oxygen. The former would include such compounds as alkyl, aryl perbenzoates, the latter would include alkyl and aryl persulfates. Among the inorganic peroxy compounds, are hydrogen peroxide and metal peroxides, such as lead, barium, and zinc peroxide. Among the basic oxides which may be used as linking agents are magnesium oxide, zinc oxide, and lead oxide. Among the inorganic polysulfides which may be used are the alkali metal polysulfides and ammonium polysulfides. In order to effect the cross-linking reaction, it is necessary that the polymer containing cross-linking agent be heated for a period of time. Generally, the polymer is heated at a temperature between about 100° C. and about 200° C., depending upon the decomposition temperature of the cross-linking agent, for a period of time between about 1 hour and about 48 hours. Since the incorporation of the cross-linking agent within the copolymer is usually affected by mechanical means which generate heat, the cross-linking agent is preferably added last, that is after the plasticizer has been dispersed. A particularly valuable cross-linking reaction employing diamines, such as ethylene diamine, diethylene triamine, hexamethylene diamine, diamino stilbene, etc. is described in the copending application Serial No. 372,159, filed by Fred W. West on August 3, 1953.

In order to illustrate the process of this invention, the following examples are presented below. These data are offered for purposes of illustration and are not to be construed as unnecessarily limiting.

*Example I*

A physical mixture of a homopolymer of trifluorochloroethylene in the form of a low density powder (about 100% through a 16 mesh screen) was admixed with a 12% solution of a copolymer of trifluorochloroethylene and vinylidene fluoride (about 75/25 mol ratio) in a solvent mixture of tetrahydrofuran and xylene. The proportions were such that the result was 5% by weight of plasticizer and 95% by weight of the homopolymer of trifluorochloroethylene, the mixture was blended in a ball mill and a film was pressed from the resulting paste, the temperature was 170° C., the pressure was 2500 pounds per square inch gage, time 20 minutes. A 10 mil film was so prepared, which was flexible, strong, transparent, uniform and pinhole free.

*Example II*

The paste mixture described in Example I was air-dried and a film was pressed from the dried residue under the conditions enumerated in Example I; the film was identical to that described in Example I.

*Example III*

A physical mixture of a homopolymer of trifluorochloroethylene was made with a solvent mixture of tetrahydrofuran and xylene. The mixture was blended in a ball mill, and the resultant paste was pressed under the conditions described in Example I. This film was hard, brittle, translucent and had some pinholes. The omission of the plasticizer obviously affected the quality of the product.

Various alterations and modifications of the invention and its aspects may become apparent to those skilled in the art without departing from the scope of this invention.

Having thus described my invention, I claim:

1. A novel composition which comprises a normally solid thermoplastic perfluorochloroethylene homopolymer admixed with a normally solid copolymer containing between about 5 and about 95 mole percent of a perfluorochloroethylene copolymerized with another ethylene having at least one halogen substituent selected from the group consisting of fluorine and chlorine.

2. The composition of claim 1 wherein the halogenated olefin is vinylidene fluoride.

3. The composition of claim 1 wherein the halogenated olefin is vinyl fluoride.

4. The composition of claim 1 wherein the halogenated olefin is vinyl chloride.

5. The composition of claim 1 wherein the halogenated olefin is vinylidene chloride.

6. The composition of claim 1 wherein the halogenated olefin is 1,1-fluorochloroethylene.

7. A novel composition which comprises a normally solid thermoplastic perfluorochloroethylene homopolymer admixed with a normally solid copolymer containing between about 5 and about 95 mol percent of trifluorochloroethylene copolymerized with vinylidene fluoride.

8. A novel composition which comprises a normally solid thermoplastic perfluorochloroethylene homopolymer admixed with a normally solid copolymer containing between about 20 and about 80 mol percent of trifluorochloroethylene copolymerized with vinylidene fluoride.

9. A novel composition which comprises a normally solid thermoplastic perfluorochloroethylene homopolymer admixed with a normally solid copolymer containing between about 20 and about 69 mol percent of trifluorochloroethylene copolymerized with vinylidene fluoride.

10. A novel composition which comprises a normally solid thermoplastic perfluorochloroethylene homopolymer admixed with a normally solid copolymer containing between above about 69 and about 80 mol percent of trifluorochloroethylene copolymerized with vinylidene fluoride.

11. A novel composition which comprises a thermoplastic homopolymer of trifluorochloroethylene admixed with a normally solid copolymer containing between about 5 and about 95 mol percent of trifluorochloroethylene copolymerized with vinylidene fluoride.

12. A novel composition which comprises a thermoplastic homopolymer of trifluorochloroethylene admixed with a normally solid copolymer containing between about 20 and about 80 mol percent of trifluorochloroethylene copolymerized with vinylidene fluoride.

13. A novel composition with comprises a thermoplastic homopolymer of trifluorochloroethylene admixed with a normally solid copolymer containing between above about 69 and about 80 mol percent of trifluorochloroethylene copolymerized with vinylidene fluoride.

14. A novel plastic composition comprising a homogeneous perfluorochloroethylene homopolymer-mass and intimately dispersed therein between about 1 and about 25 weight percent of a copolymer containing between about 5 and about 95 percent of trifluorochloroethylene copolymerized with vinylidene fluoride.

15. A novel plastic composition comprising a homogeneous trifluorochloroethylene homopolymer-mass and intimately dispersed therein between about 1 and about 25 weight percent of a copolymer containing between about 69 and about 80 mol percent of trifluorochloroethylene copolymerized with vinylidene fluoride.

16. A novel plastic composition comprising a homogeneous trifluorochloroethylene homopolymer-mass and intimately dispersed therein a copolymer containing between about 20 and about 69 mol percent of trifluorochloroethylene copolymerized with vinylidene fluoride.

No references cited.